April 28, 1964  D. M. MAKOW  3,130,553
VARIABLE-TEMPERATURE PORTABLE TESTING CHAMBERS
Filed Nov. 13, 1962  2 Sheets-Sheet 1
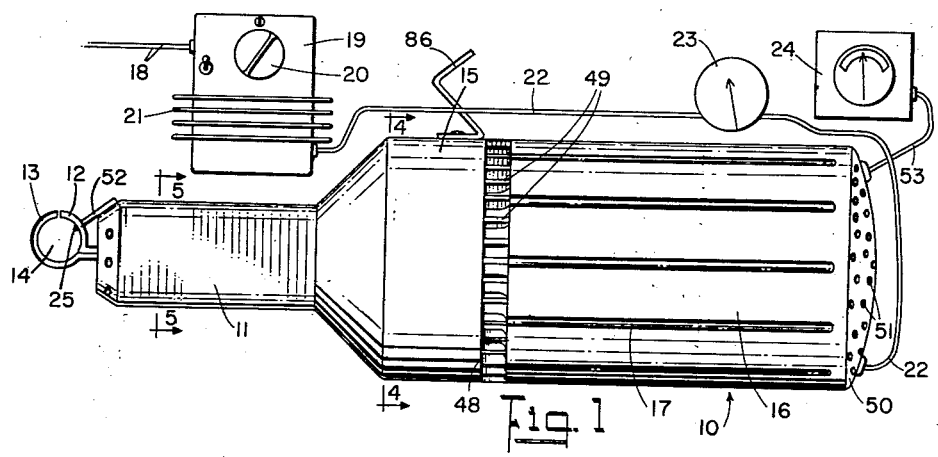
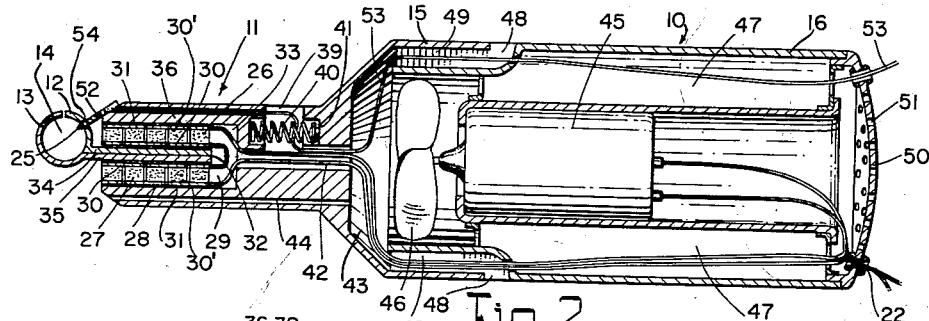
INVENTOR
DAVID MARK MAKOW

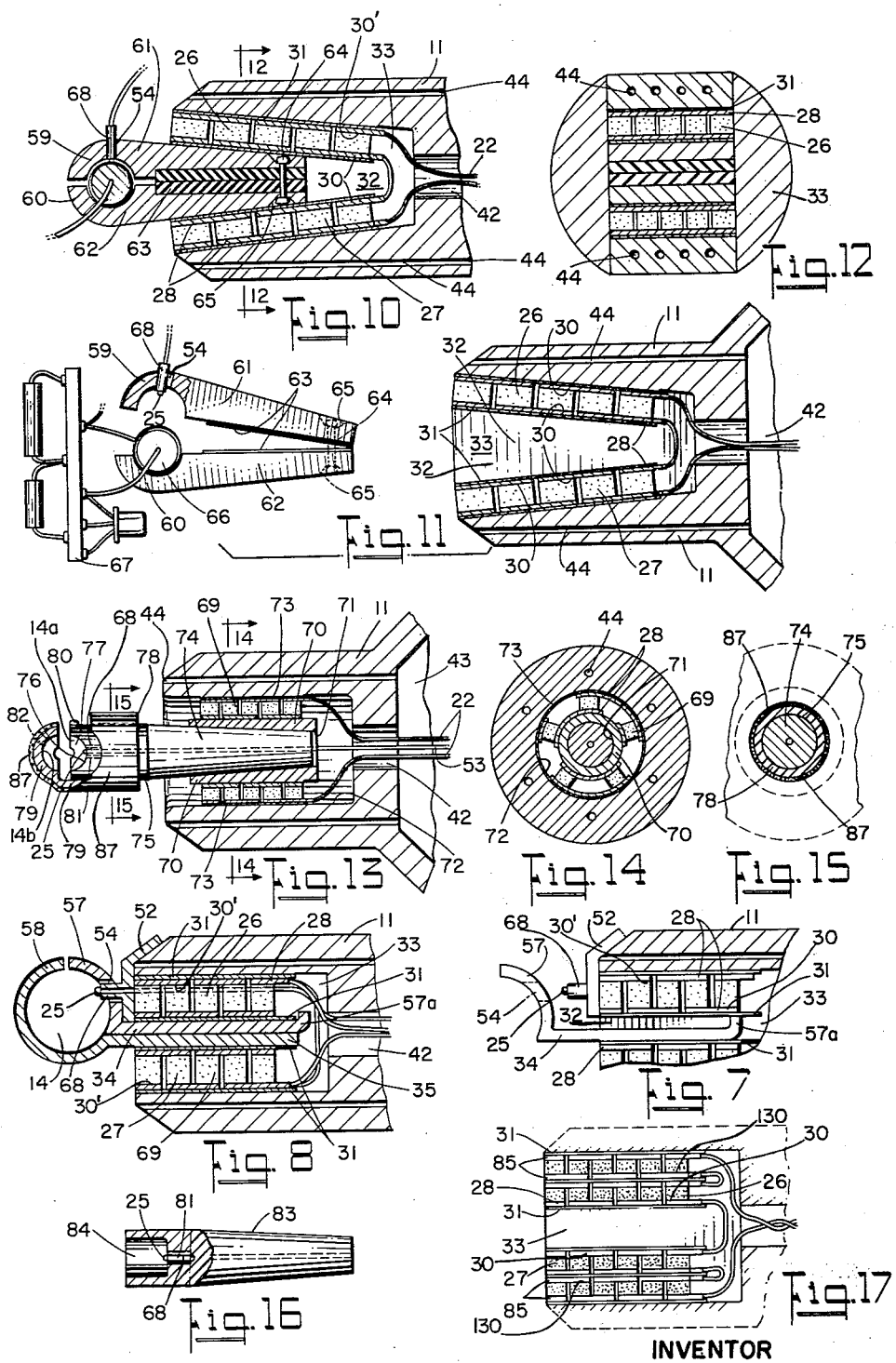

United States Patent Office 3,130,553
Patented Apr. 28, 1964

3,130,553
VARIABLE-TEMPERATURE PORTABLE TESTING CHAMBERS
David Mark Makow, Ottawa, Ontario, Canada, assignor to National Research Council, Ottawa, Ontario, Canada, a body corporate of Canada
Filed Nov. 13, 1962, Ser. No. 236,972
11 Claims. (Cl. 62—3)

This invention relates to testing apparatus for electrical components and more particularly concerns a portable test device for placing an operative component of a circuit, such as a capacitor, transistor, or the like in a temperature-regulated enclosure for heating or cooling the component over a wide range of temperatures.

In the observation of performance of electrical equipment under effects of variable ambient temperature it has hitherto been customary to provide temperature-controlled chambers or test rooms in which the equipment is allowed to stand to reach equilibrium with the room temperature. Such testing requires elaborate heating and cooling means of large scale and high cost as well as requiring elaborate control means for temperature regulation of the large masses involved. It has been difficult to determine by such gross testing what effect on circuit performance, such as oscillation frequency, is produced by temperature changes in any one component. In fact, unless each component's temperature is measured by direct and positive-contact thermometers the test data may be greatly in error. The art has lacked any simple and yet effective device in the nature of a hand-held probe capable of being fitted in enclosing relation about a circuit component to provide a miniature chamber whose temperature may be varied quickly either upwardly or downwardly from ambient temperature, while the other components remain unchanged in temperature.

The present invention is embodied in a low-cost, simple device for controllably heating or cooling a component, comprising a heat sink mass held at a predetermined temperature, i.e., ambient, a heat exchange body whose temperature is controllably variable including heating and cooling means for transferring heat to the body from the sink and for removing heat from the body to the sink, and heat-conducting enclosures in contact with the heat exchange body for closely contacting the component to place it substantially in temperature equilibrium with the heat exchange body.

In carrying the invention into effect the heat sink may be connected with or itself be the atmosphere or other extensive body of significantly large heat capacity, and the enclosures are realized as cupping metal parts which are separable for manual fitting about an element, and are arranged to be brought to a desired temperature through contact with a metal heat exchange body which itself is in direct contact for heat transfer with a junction of a thermo-electric element or with like junctions of a group of such elements.

In such organization the cupping parts may be heated or cooled depending on the chosen direction of D.C. current flow through the thermo-electric element or group of such elements, heat being either brought in from the heat sink or dissipated thereto under the pumping action of the current. The temperature of the cupping parts may be regulated by manual control under observation of the current supplied to the thermo-electric elements, or the actual temperature of the electrical component being tested may be measured by a contact thermometer, preferably a probe having a thermistor sensing element connected in a bridge circuit to provide a direct reading of temperature difference from ambient on a meter scale.

Essentially the invention, in its preferred embodiments, consists of a hand-held tool or probe-like device having a heat sink held at ambient temperature by movement of a current of air through a heat exchanger body of extensive surface, an assembly of thermo-electric elements having their like junctions in good heat-conduction contact relation with the heat exchanger body and having their other junctions in good heat-conduction contact relation with metal extensions terminating in cupping parts for enclosing an electrical component to be studied, and a circuit for regulating a direct electrical current flow through the series-connected group of thermo-electric elements in either direction for either cooling or heating the metal extensions. These extensions may be insertable into a recessed heat exchanger body or otherwise made to be movable to permit enclosing most of the surface of an electrical component or the like within the cupping parts, and the temperature of the component is preferably arranged to be measured by an associated thermistor probe physically held in contact with the component while it is enclosed within the cupping elements, the thermistor being arranged in an ohmmeter circuit with a deflection directly readable in temperature relative to ambient.

The invention may be the better understood both as to its principles and practice by a study of the following description of its embodiments as diagrammed in the accompanying drawings, wherein:

FIGURE 1 is a side elevation view of a device for enclosing and raising or lowering the temperature of a component according to the invention, and associated power supply and temperature indicating display means;

FIGURE 2 is a vertical longitudinal diametral section of the device of FIGURE 1;

FIGURE 3 is a detail of part of the device of FIGURE 1 partly cut away to show a retractable cupping element;

FIGURE 4 is a vertical transverse section taken on line 4—4 of FIGURE 1;

FIGURE 5 shows a section taken on line 5—5 of FIGURE 3;

FIGURE 6 shows a section similar to FIGURE 5 of a modified tool showing more complete cooling passages;

FIGURE 7 shows an alternative form of cupping elements as partly assembled into the device of FIGURE 6;

FIGURE 8 shows the arrangement of a pair of cupping elements as assembled in the device of FIGURE 6;

FIGURE 9 illustrates a temperature-indicating arrangement employing a contact type of thermistor and a bridge balance circuit;

FIGURE 10 shows a section similar to FIGURE 2 wherein the cupping elements are symmetrical and are insertable into a tapered recess in a heat-exchanger assembly;

FIGURE 11 shows the assembly of FIGURE 10 in separated relation during fitting of cupping elements to a component to be varied in temperature;

FIGURE 12 shows a section taken on line 12—12 of FIGURE 10;

FIGURE 13 shows a vertical diametral section of a modified device having a cylindrical shell array of thermo-electric elements;

FIGURE 14 is a transverse section on the line 14—14 of FIGURE 13;

FIGURE 15 is a transverse section taken on line 15—15 of FIGURE 13;

FIGURE 16 is a partial section of a single enclosing extension similar to the FIGURE 13 extension having a chamber for enclosing a component insertable thereinto; and, FIGURE 17 shows a modification of the device of FIGURE 8 wherein the arrays of thermo-electric elements are cascaded.

Referring to the drawings, a hand-held applicator device 10 according to the invention for surrounding an electrical component such as a resistor, capacitor, diode, transistor or the like, within a heat exchange enclosure whose temperature is adjustably different from ambient temperature, comprises a forward neck portion 11 of metal having extending therefrom metal cupping elements 12 and 13 adapted to be placed about the component which lies between them in a space or chamber 14. Intermediate body portion 15 of larger diameter formed of metal joins the neck portion 11 with a cylindrical handle portion 16, the surface of the latter being longitudinally fluted as at 17.

Operating power for the device is supplied as from mains A.C. supply leads 18, shown connected to a variable-voltage transformer 19 whose output is regulated by the setting control 20 and which is supplied to a rectifier unit 21 with suitable filter for supplying direct current of either polarity over leads 22 to the device 10 through an ammeter 23. Such arrangement of current control and supply facilities is to be understood as exemplary only, and it is contemplated that a self-contained battery supply together with reversing switch and regulating rheostat means may alternatively be provided.

A temperature indicator 24 is supplied by leads 53 connected with a suitable electrical sensing element 25, for the purpose of providing a visual display of actual temperature of a component enclosed within the cupping elements 12 and 13, a circuit for such indicator being described hereinafter in further detail.

As shown in FIGURES 2, 3, and 5, the device comprises a pair of upper and lower compactly arranged thermo-electric element arrays 26 and 27 connected in a common series circuit by heavy interconnectors 28 fed from current-carrying leads 22 and supported in spaced apart relation within a recess 29. Like current-carrying junctions 30 of respective arrays are parallelly spaced and are opposed. These junctions manifest like Peltier effects for current flowing in one direction, for example, heat will be either pumped to the junction or pumped away from the junction, otherwise than by dissipation through resistive heating common to both types of junctions. With suitable thermo-electric couples in a ladder configuration of lattice comprised of p and n type semiconductor having a high thermo-electric coefficient, a temperature difference of as much as 60° C. or more may be manifested between the hot junctions and the cold junctions.

The surfaces of like opposed junctions 30 are arranged in planes as are also the surfaces of opposite junctions 30'. The latter are electrically isolated from the metal neck by a thin insulating layer 31 of high thermal conductivity, e.g., anodized aluminum strip, and are supported from the layer by a suitable adhesive, the layers being in turn adhesively secured to the opposed walls of the recess 29. A narrow slot 32 separates the faces 30. Heat-insulating bodies 33 are provided between the sides of the thermo-electric arrays and the side walls of the recess 29.

Strip shank 34 extending integrally from the cupping element 12 preferably is constituted as anodized aluminum, and is disposed in the slot 32 in good heat-conductive contact relation with the faces 30 of array 26, and a like shank 35 extending integrally from element 13 is similarly in contact with opposed faces 30 of array 27. The strip extensions are arranged to be in free but intimate sliding relation and are not so tightly held as to prevent withdrawal but firmly enough gripped so as to be retained in all attitudes of handling. The wall of the neck portion on which array 26 is supported is a movable bar 36 having parallel side edges 37 slidably received and guided between opposed grooves 38 in the neck portion as shown in FIGURE 3. As the movable support is retracted, it carries the element 12 away from 13 into the recess 39 formed in the neck portion and opens the chamber 14 so that a component having a pair of end leads may be cupped within the element 13 and the support is then slid back to close the elements against each other. Preferably, a biasing force is applied by a compression spring 40 disposed between the end wall 41 of the recess and the end of the slide as to urge the movable support into closing relation of the cupping elements.

A longitudinal bore 42 is provided between recess 29 and a much larger diameter bore 43 within the flaring body portion 15, to pass the direct current carrying leads therethrough.

Within the wall of the neck portion 11 a number of ventilation bores or passages 44 are provided, opening into the end of the neck portion and extending ino the bore 43. A blower motor 45 is mounted within the handle portion 16 for driving impeller blades 46, which set up a flow of air from the body portion through venting space 47 in the handle 16. The blower may be powered by self-contained dry cell sources (not shown) or may be supplied as depicted from the direct current supply. Air is drawn in partly through the group of ventilation bores 44 and in part through a large plurality of ports 48 opening at the junction of the body portion 15 and the handle portion 16, these ports being the exposed spaces between a large plurality of fins 49 fitted in close contacting but detachable relation with the wall of bore 43 as shown in FIGURE 4. The air stream due to the impelling action of the blades is made to be of such flow rate and volume as to prevent the temperature of the metal mass of the neck portion 11 as well as of the body portion 15 from rising or falling appreciably with respect to ambient temperature of the surrounding atmosphere. When the current of air and the number and spacing of the ventilating bores 44 as well as the fineness and surface area of the fins 49 is adequate, the junctions 30' may be held at substantially the temperature of the atmosphere and hence stabilized as to temperature.

The current of air in venting space 47 moreover serves to dissipate any heat imparted to the handle portion through contact with an operator's hand, and to cool the blower motor as well as any components of the D.C. supply if these are located in the space. The air drawn into the device through bores 44 and ports 48 is expelled after applying a cooling or a heating effect on the junctions 30', through end cap 50 which is detachably fitted in the end of the handle 16, passing out through apertures 51.

The movable support 36 is alternatively suitably finned (not shown) to increase its surface area for improving the capacity of the support for exchanging heat with the atmosphere. A film of a heat-conductive grease or like substance may be employed between a component enclosed within the cupping parts 12, 13, as well as along the grooves 38, to reduce thermal gradients between contacting parts.

The temperature of a component which is surrounded by the cupping parts 12, 13 is directly measurable by means of a thermistor bead probe 25 supported upon an insulation body 52 within the chamber 14 in positive contact with the surface of the component. The pair of leads 53 from the thermistor are carried in any suitable manner, as by being passed along one of the ventilation bores 44 into the recess 39, thence along bore 42 and into space 43, passing between fins 49 and into venting space 47, from which space they are carried out of cap 50 to a suitable circuit, as will be described in connection with FIGURE 9. The cupping part 12 is apertured at 54 to receive the bead support 52 passed therethrough.

The indicator 24 is preferably arranged to be of the direct reading type, to which end it is provided with a scale 55 of direct reading type, calibrated in degrees above and below a reference temperature, which is preferably ambient temperature. A suitable circuit is shown in FIGURE 9, wherein the thermistor 25 forms an arm of a bridge including stable resistors R1 and R2, the value of R2 being chosen or made adjustable for equality with the resistance of the thermistor at ambient temperature. With R2 so adjusted, and with switch S closed, current from battery 56 divides between the bridge branches equally. On change of bead temperature the scale is readable directly as a temperature difference from ambient. The circuit illustrated represents one possible arrangement, and those skilled in the art will understand that many other arrangements may alternatively be employed to measure and display temperature. The circuit components of the electrical supply as well as of the temperature indicator may all be housed within the handle, preferably so located as to be at the ambient temperature, and the meter 24 may be carried upon the device 10 in any suitable position for viewing, as for example upon the bracket 86.

In the embodiment of FIGURE 2, the cupping elements 12 and 13 are simply pressed into the space 32 between the junction faces 30, so that a range of sizes and shapes of cupping parts may be employed interchangeably, all having the same shank forms as 34 and 35. To facilitate the fitting of a component into the space 14, the cupping part 12 is formed with an arcuate length considerably less than 180 degrees but at least 120 degrees in extent, while part 13 occupies the remainder of the circumferential distance of the cylindrical shell enclosing the space 14. Preferably the cupping part 13 has its shape formed to be very slightly larger in inside diameter than the outer diameter of the component to be tested, the remaining space being occupied by a heat-conductive grease for optimum heat transfer rate. The axis of the chamber 14 is preferably transverse to the length of the device 10, i.e., at right angles to the direction of insertion of the shanks 34, 35.

In an alternative embodiment the neck portion is constructed without any recess 39 as appears in FIGURES 2, 3 and 5, and the array 26 is fixed on the wall of recess 29 as diagrammed in FIGURE 6. The cupping element shanks 34 and 35 are similarly made insertable and are receivable between the isolating strips 31 secured on junction faces 30 as a light press fit. Heat-insulation bodies 33 are fitted between the sides of the arrays 26, 27, and the side walls of recess 29. The entire cross section of the neck portion wall is provided with the longitudinal ventilation bores 44.

In the further embodiment shown in FIGURES 7 and 8 the inner cupping element 57 is formed with an aperture 54 to receive the bead support 52. The end of the shank 34 remote from the chamber-forming terminal 57 is flanged at 57a, the flange extending to the same side as the terminal. The offset distance of the extremity of flange 57a is slightly less than the width of slot 32 between opposed junction faces 30 so that the strip may be inserted freely as shown in FIGURE 7. When the unflanged companion shank 35 which has the chamber-completing terminal 58 is introduced between the face 30 of the lower array and the shank 34 with the flange 57a engaged behind the electrical isolation strip 31 of the upper array 26, the upper shank is held locked while friction holds the lower one firmly placed.

In the embodiment of FIGURE 10 the cupping elements 59, 60 are symmetrical and have respective shank portions 61 and 62 tapering in thickness, reducing in cross-section away from the chamber 14. The thermoelectric element arrays are disposed with their planar faces 30 in non-parallel relation, the recess 29 being tapered inwardly so that the junction faces 30 conform to the taper of the shanks 61 and 62. A thin resilient layer 63, such as a rubber compound, faces the meeting surfaces of the shanks, while their thinner ends are connected loosely by a link 64 passed through recessed holes 65 which extend in line through the small ends of the shanks. The chamber-surrounding portions 59, 60 are thereby separable as shown in FIGURE 11 to allow the cupping parts to be fitted over a component such as a capacitor 66 associated wtih a chassis 67. A thermistor bead-support plug 69 of an insulating structural material is received in a side aperture 54 formed in upper element 59, the plug being fitted into the chamber 14 after the component has been enclosed and the contacting shanks fitted into slot 32. Heat-insulating bodies 33 extend along the sides of the arrays to guide and restrain the shanks.

It is to be noted that the direction of insertion of the component is parallel to the length of the shanks in the embodiment of FIGURE 10.

In an alternative embodiment shown in FIGURE 13 which is particularly adapted for rapid regulation of component temperature, a thermo-electric element array 69 in the form of a thick ring is provided wtih interconnectors in the form of arcuate or polygonal strapping or buses 28. A thickened inner tubular spacer 70 of anodized aluminum is fixed to the array and has a conic bore 71 tapering inwardly, for example having a #3 Morse taper. The array of elements 69 has its outer junctions 30' electrically isolated from but in good heat-conductive relation with the inner surface of a cylindrical bore 72 recessed into the end of the neck portion 11, the latter being a thick-walled cylindrical shell body. An isolating spacer 73 is provided comprising a thin walled aluminum tube having its surface anodized and cemented to the wall of bore 72. The spacer may be omitted where the bore wall is itself anodized.

A tapered extension 74 is made a wringing fit into the conic bore 71 within which it is frictionally retained, and the extension terminates beyond the end of the device 10 in a cylindrical rod portion 75 having a recess 76 formed in its end. The axis of the recess, which is nearly a semicylinder, is transverse to the axis of the extension, and the ends of the recess are bounded by end walls 77 providing between them a half-chamber 14a whose length will accommodate a component. A tubular collar 78 is a close sliding fit over the cylindrical end portion 75 and has an axial length less than the length of the cylindrical portion. An integral extension 79 of the collar terminates in a semi-cylindrical shell 179 having bounding end walls forming a half-chamber 14b similar to 14a. The length of 79 is such that when the collar 78 is slid forward against a stop 80 formed on the end of the rod portion 75, space is provided between the opposed portions of rod 75 and shell 179 sufficient to permit insertion of a component with its axis transverse to the extension.

The shell wall of neck portion 11 is provided with a plurality of ventilation bores 44 peripherally spaced about the array. A thermistor 25 supported on a plug 68 is received in a stepped bore 81 in extension 74 to protrude within the recess 76 for physical contact with a component or other article (not shown) in the chambers 14a, 14b. The leads 53 may be carried out in any suitable manner, for example axially along a bore as where the device 10 is used for repeated testing of one size of component. Where the extension 74 is made in several forms for use with a range of article or component sizes, the plug 68 is preferably received in a side aperture 82 formed in the extension 79 and the leads are carried back as by way of a ventilation bore 44.

In the testing of components or other articles which are insertable in an endwise direction, as for instance certain transistors and like encapsulated components a single extension body 83 may be substituted for the extension 74, differing from the latter only in that the outer end has a chamber 84 of suitable cross section recessed in it, as shown in FIGURE 16. Such chamber may be partly closed after an article has been received therein as by a suitable plug, stopper, or flap (not shown) to prevent heat transfer by convection of air.

While single arrays of thermo-electric elements have been described, it will be understood that a somewhat greater temperature difference from ambient may be provided in chambers 14 of the several forms of extensions shown, by cascading the arrays of elements, i.e., stacking them for series heat transfer according to the known disposition illustrated in FIGURE 17. In such cascade arrangement, plane spacer strips 31, or tubular spacers 73, are provided to electrically isolate the physically contacting array surfaces while allowing heat to flow between the junction faces 30' and the contacting junctions of the superposed array elements 85. The current flow in the array 85 is poled so that the heat transfer action at faces 30 is in the same direction as at the faces 130 of the superposed array. While various losses inherent in the two-array cascade arrangement illustrated make it impossible to realize doubling of the temperature difference as between faces 130' and faces 30, a significant increase is possible as compared with the difference across a single element. Moreover, cascading of three or more arrays in like manner is feasible, particularly where the heat generated in the article or component being tested is very small and where the component or article requires to be evaluated at more extreme temperatures.

To facilitate achieving very cold cooling, the surfaces of terminals 76 and 79 in FIGURE 13 may be provided with a heat insulating layer 87 to prevent condensation and frosting.

While the foregoing description has particularly described test means for use with smaller electrical components, such as miniature resistors, capacitors, and the like, requiring only from 10 to 20 watts input to the thermo-electric elements, the invention is in no way restricted to these small articles. It will be apparent that by a change in size and arrangement of arrays much larger articles may be heated or cooled controllably, and specimens of plant and animal life studied. Accordingly, the foregoing description is understood to be exemplary of the principles and practice of the invention, whose scope is defined by the appended claims.

I claim:

1. Apparatus for cooling and warming an article comprising a heat exchange body adapted to be maintained substantially at a predetermined temperature, a recess in said body, a heat conducting enclosure formed as a pair of separable complementary cupping parts adapted to be fitted as a chamber in which the article is enclosed, said parts having integral elongate metal extensions receivable and insertable in said recess in the direction of their lengths, a thermo-electric heat pump for transferring heat from said body to said extensions and alternatively for transferring heat from said extensions to said body, said pump comprising arrays of thermo-electric elements formed of dissimilar materials disposed in said recess and arranged to provide a plurality of junctions of one type and a plurality of junctions of a second type respectively in contact with said heat exchange body and with said extensions, means to cause electrical current to flow controllably in said junctions to operate said heat pump, and means to measure the temperature of said article.

2. Apparatus as claimed in claim 1 wherein said chamber is tubular and has its axis transverse to the length dimension of said extensions.

3. Apparatus as claimed in claim 1 wherein said means to measure article temperature comprises a thermistor having an insulated support and wherein one of said cupping parts is apertured to receive said support to hold said thermistor in contact with said article for temperature equilibrium therewith.

4. Apparatus as claimed in claim 1 wherein said heat exchange body has a plurality of ventilation ducts formed in it and said apparatus includes means for drawing air through said passages to maintain said body substantially at the ambient air temperature.

5. Apparatus as claimed in claim 4 having a pair of planar arrays and wherein said body has a parallel-sided recess, said body having a portion slidably fitted for reciprocating movement parallel to said arrays with respect to the remainder of said body and said portion supporting one of said arrays, and means to lock one of said extensions for movement with said sliding body portion.

6. Thermo-electric apparatus for heating and cooling an article comprising a metal body having a recess therein, means to stabilize the body temperature, an elongate heat-conducting rod-like probe detachably insertable by one end in said recess, an array of thermo-electric elements arranged in said recess between said probe and the wall of the recess and disposed for alternatively pumping heat from said probe to said body and from said body to said probe, said probe having an end extending beyond said body from said recess and said end being formed as an article-receiving recess for producing temperature equilibrium of an article received therein with said probe, current supply means for passing current through said elements, and means to control the direction and magnitude of the electrical current.

7. Apparatus as claimed in claim 6 wherein the said probe comprises a pair of metal strips having opposed planar meeting faces and having complementary cupping separable end portions forming an article-receiving recess for clamping about a tubular article prior to insertion of said probe into said body recess.

8. Apparatus as claimed in claim 7 wherein said metal strips are tapered and decrease in a cross-sectional dimension toward their ends remote from said cupping portions, and said body recess has a like tapering dimension.

9. Apparatus as claimed in claim 8 wherein said metal strips are symmetrical about a contact plane and each part comprises a semi-cylindrical recess.

10. Thermo-electric apparatus for heating and cooling an article comprising a metal body having a recess therein and a plurality of ventilation ducts, blower means for passing a current of air through said ducts to hold the body at the temperature of ambient air, a unitary heat-conductive rod-like probe detachably insertable in said recess by one end and extending beyond said body, a ring array of thermo-electric elements arranged between said probe and said body and disposed for alternatively pumping heat from said probe to said body and from said body to said probe, a chamber formed in said probe for surrounding the article, current supply means for energizing said array, and current control means to regulate the article temperature.

11. Apparatus as set forth in claim 10 wherein an outer end of said probe supports a collar slidably fitted on the probe and said collar carries a cap having a recess opposed to the chamber, said collar being movable to expose said chamber, and wherein said cap and collar are provided with a heat-insulating surface coating layer.

References Cited in the file of this patent

UNITED STATES PATENTS

| | | |
|---|---|---|
| 2,922,284 | Danielson | Jan. 26, 1960 |
| 2,959,925 | Frantti | Nov. 15, 1960 |
| 2,991,628 | Tuck | July 11, 1961 |
| 3,064,440 | Waller | Nov. 20, 1962 |